June 10, 1958  H. H. NELSON ET AL  2,838,271
J-PIN VALVE
Filed May 23, 1955  2 Sheets-Sheet 1
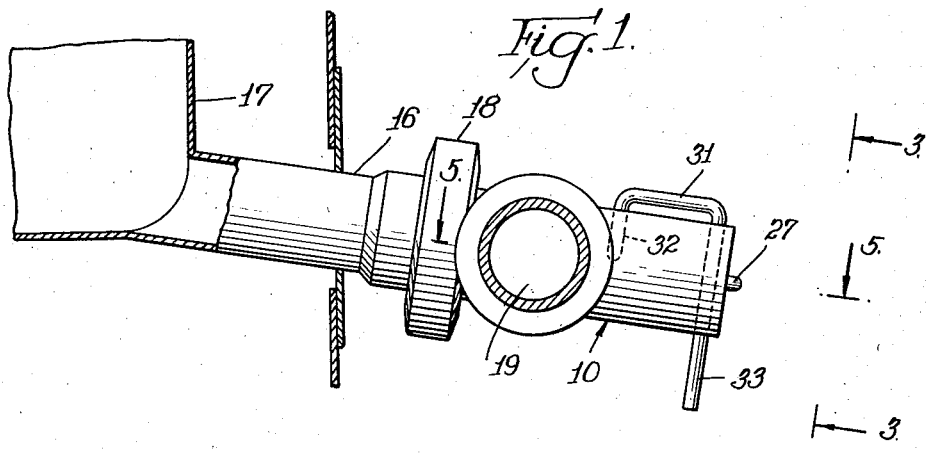
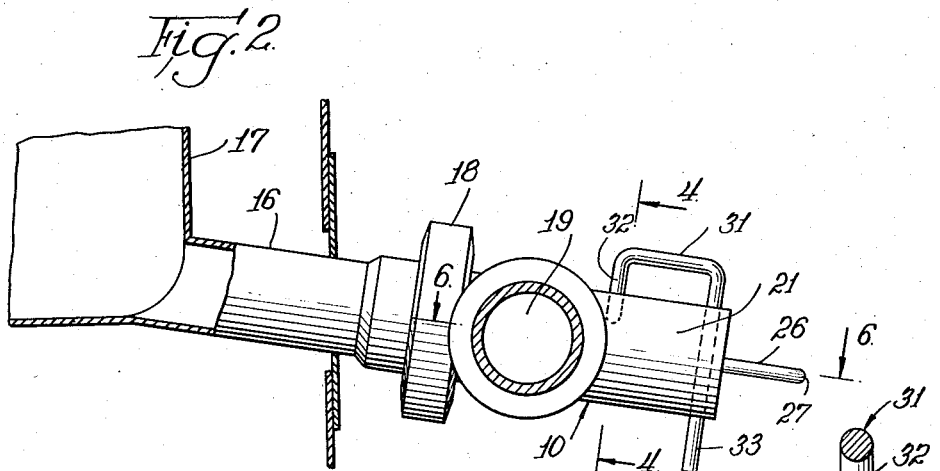
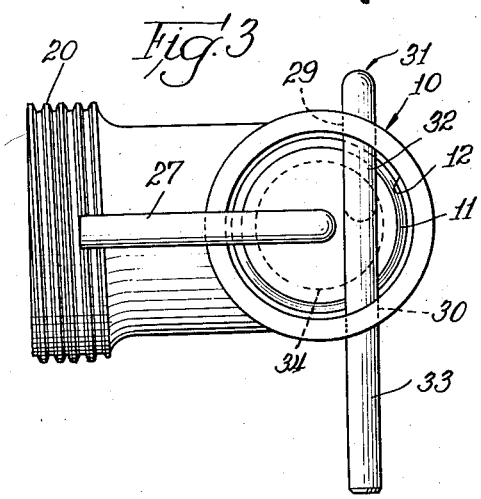
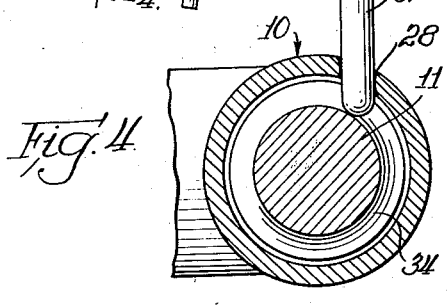
INVENTORS:
Harold H. Nelson
and Eugene K. Nelson
BY
E. Manning Giles
Atty.

June 10, 1958
H. H. NELSON ET AL
2,838,271
J-PIN VALVE
Filed May 23. 1955
2 Sheets-Sheet 2
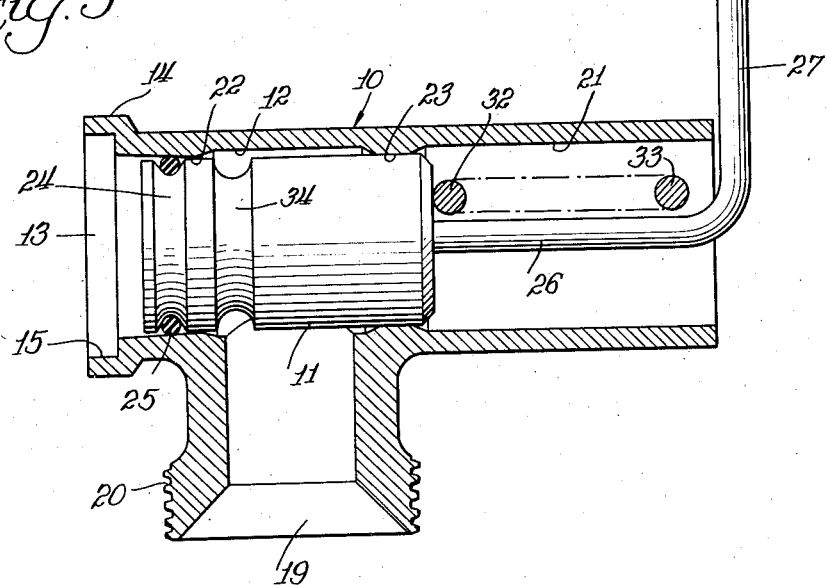
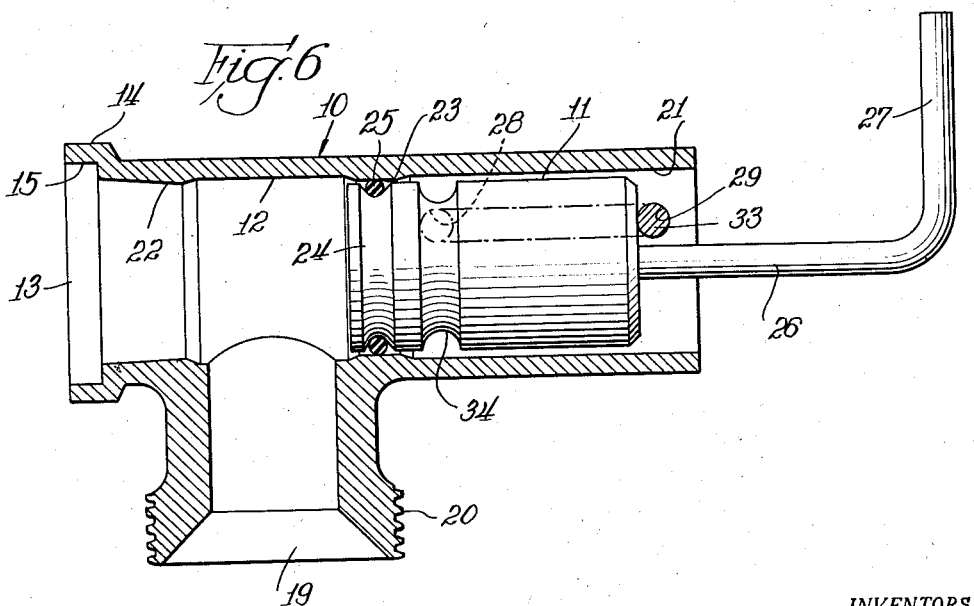
INVENTORS:
Harold H. Nelson
and Eugene K. Nelson
BY
E. Manning Giles
Att'y.

United States Patent Office 2,838,271
Patented June 10, 1958

2,838,271
J-PIN VALVE

Harold H. Nelson and Eugene K. Nelson, Cedar Rapids, Iowa, assignors to Cherry-Burrell Corporation, Chicago, Ill., a corporation of Delaware Application May 23, 1955, Serial No. 510,216

3 Claims. (Cl. 251—111)

Our invention relates to a piston valve in which a removable J-pin is provided to position the piston in its open and closed positions, and is a continuation-in-part of our pending application, Serial No. 389,404, filed October 30, 1953, now Patent No. 2,798,690.

The valve of our invention is preferably of the sanitary type such as may be used in the handling of milk and is adapted especially for use as an outlet valve in storage tanks of the type used for collecting milk on dairy farms.

The principal objects of our invention are to provide a sanitary piston valve of simple design which may be used alternatively in the full open or full closed position; to preclude accidental displacement of the valve from either the open or the closed position; to design such a valve composed of a minimum number of parts which may be disassembled and reassembled conveniently and rapidly for cleaning; to employ therewith indexing holes through which a suitable J-pin may be engaged to hold the piston in its normally closed position; to provide such J-pin with an elongated leg which can remain engaged in one of said indexing holes when the shorter leg is removed from the other, thus providing a second stop against which the piston may be retracted to full open position; to provide a circumferential groove in the piston of sufficient size and so positioned as to receive the end of the short leg of the J-pin and when so engaged to prevent return of the piston to a partially closed position; to develop such a valve which involves no metal-to-metal sliding contact and which therefore may be expected to have long, trouble-free life; and to devise such a valve which is moderate in cost and convenient to use, these and other objects being accomplished as hereinafter described, reference being had to the accompanying drawing in which:

Fig. 1 is a side view of a piston valve embodying our invention as it appears in the closed position;

Fig. 2 is a view similar to Fig. 1 but in the open position;

Fig. 3 is a view on the line 3—3 of Fig. 1;

Fig. 4 is a view on the line 4—4 of Fig. 2;

Fig. 5 is a view on the line 5—5 of Fig. 1; and

Fig. 6 is a view on the line 6—6 of Fig. 2.

Referring now to the drawing, our piston valve consists of a substantially tubular valve body designated generally by the reference numeral 10 and a piston 11 mounted within said valve body 10 for reciprocal movement within a central bore 12 thereof.

The valve body 10 is provided with an inlet 13 at one end thereof communicating with the central bore 12, the inlet 13 having a peripheral enlargement 14 and a seat 15 adapted to engage in mating relation with a complementary seat (not shown) on a drain 16 from a milk storage tank 17. The valve seat 15 is held in engagement with the complementary seat by a clamping collar 18.

The valve body 10 is provided with an outlet 19 at the side thereof communicating with the central bore 12 at approximately right angles thereto. The outlet 19 is provided with external threads 20 to permit convenient attachment thereto of a conventional sanitary coupling.

At the end of the valve body 10 remote from the inlet 13 our valve is provided with an extended cylindrical portion 21 into which the piston 11 may be retracted when the valve is in the open position so as to permit communication between the inlet 13 and the outlet 19.

The central bore 12 is provided with a restriction of reduced diameter between the inlet 13 and the outlet 19 to provide a seating surface 22, and is similarly provided with a restriction of reduced diameter between the outlet 20 and the extended portion 21 to provide a corresponding seating surface 23.

The piston 11 has a peripheral groove 24 at the end toward the inlet 13 and may optionally be provided with a similar peripheral groove at the end toward the extended cylindrical portion 21. A resilient O-shaped sealing member 25 is seated in the peripheral groove 24 and, where a similar groove is provided at the opposite end of the piston 11, a similar sealing member would be engaged therein. The said sealing member 25 is preferably an O-ring and may be made of neoprene rubber or the like. The O-ring 25 is thicker than the depth of the peripheral groove 24 so that the outer edge of the O-ring 25 extends beyond the edge of the piston 11.

The piston 11 is of slightly reduced diameter with respect to the seating surfaces 22 and 23 so that it may move freely therethrough but the O-ring 25 is of sufficient thickness to engage the seating surface 22 when the piston 11 is in the closed position shown in Fig. 5 and to be compressed in sealing relation between said seating surface 22 and the peripheral groove 24. Likewise, when the piston 11 is retracted to the open position shown in Fig. 6, the O-ring 25 is compressed in sealing relation between said peripheral groove 24 and the seating surface 23. Thus, when the piston 11 is in the closed position, no liquid can escape from the drain 16 past the O-ring 25 and to the outlet 19. Likewise, when the piston 11 is in the open position and milk or other liquid is passing from the tank 17 out through the drain 16 and through the central bore 12 to the outlet 18, no liquid is permitted to pass the O-ring 25 compressed in sealing relation between the seating surface 23 and the peripheral groove 24.

For convenient operation of our valve, the piston 11 has an axial stem 26, the end of which is disposed at approximately right angles thereto to provide a handle 27. The inner edge of the handle 27 is adapted to abut against the outer edge of the extended cylindrical portion 21 when the piston 11 is in the closed position so as to provide a stop which insures accurate positioning of the peripheral groove 24 in alignment with the seating surface 22 so as to compress the O-ring 25 therebetween.

The cylindrical extension 21 is provided at the top with two spaced holes 28 and 29, the angle at which said holes 28 and 29 are drilled being chordwise with respect to the circumference of the cylindrical extension 21 so that a pin passing through either of said holes will not encounter the stem 26 of the piston 11.

One of said holes 28 is located adjacent the seating surface 22, and the other hole 29 is located adjacent the end of the cylindrical extension 21. A lower hole 30 is disposed opposite the hole 29 in chordwise relation therewith.

The said holes 28, 29, and 30 are adapted to receive the respective legs of a J-shaped pin 31, the shorter leg 32 of said pin 31 being adapted for insertion in the hole 28 and the longer leg 33 of said pin 31 being adapted for insertion through the aligned holes 29 and 30.

The shorter leg 32 of the pin 31, when in position in the hole 28, serves as a back-stop against which the handle end of the piston 11 may bear when said piston 11 is in the closed position. When liquid pressure is created at the inlet 13 side of the piston 11, the shorter leg 32 of the J-pin 31 serves to prevent displacement of the piston 11. Thus the J-pin 31 holds the piston 11 in the closed position.

When it is desired to open the valve, to the position shown in Fig. 6, the J-pin 31 is raised sufficiently to free the shorter leg 32 thereof from the hole 28. Preferably, the longer leg 33 is of such length as to remain engaged in both the holes 29 and 30 when the shorter leg 32 is freed from the hole 28. Thus when the shorter leg 32 has been removed from the hole 28, the piston 11 can be retracted by pulling on the handle 27 until the piston 11 backs up against the longer leg 33. The holes 29 and 30 are positioned so that when the longer leg 33 is engaged therethrough, the leg 33 serves as a backstop which stops the piston 11 in the open position when the handle 27 is pulled as far as it will go. When it is desired to clean the valve, the J-pin 31 may be removed completely and then the piston 11 may be extracted from the valve body 10 by pulling the handle 27.

The piston 11 is provided with a relatively deep peripheral channel 34 spaced from the handle end of the piston 11 substantially the same distance as the distance between the short leg 32 and the long leg 33 of the J-pin 31. The channel 34 is preferably wider than the thickness of the short leg 32. Thus, when the piston 11 has been retracted against the long leg 33, the latter being engaged in the outer hole 29 and the lower hole 30, the short leg 32 may then be inserted through the inner hole 28 and the lower end of said leg 32 will rest in the peripheral channel 34 as shown in Fig. 4 When so engaged, the piston 11 is held against displacement in either direction. The long leg 33 prevents further retraction of the piston 11 and the lower end of the short leg 32 being interposed within the channel 34, the piston 11 cannot be moved in the opposite direction toward the closed position.

When liquid such as milk is flowing rapidly through the open valve from inlet 13 to outlet 19, there is a tendency for the piston to be sucked inwardly thereby to a partially closed position. The pressure of the liquid then tends to force the piston 11 outwardly again, and the engagement of the short leg 32 in the peripheral channel 34 prevents this reciprocation or wobbling of the piston 11.

When it is desired to close the valve, the J-pin 31 is raised sufficiently to disengage the short leg 32 from the peripheral channel 34, the handle 27 is then pushed inwardly until it engages the outer edge of the cylindrical extension 21, and the J-pin 31 is then dropped back into the position shown in Fig. 1. In this position, the piston 11 is in the closed position and the short leg 32 prevents its being displaced.

It will be understood that the design of our valve as herein described is of utmost simplicity. The positioning both in the open and in the closed positions is positive and protected against accidental displacement, yet by simple removal of the J-pin 31, the piston may be removed for cleaning.

We contemplate that the sanitary valve of the type described herein would normally be made of stainless steel, but it will be understood that the valve and its components may be made of any suitable material, and while we have shown and described our invention in a preferred form, we are aware that various changes can be made theerin without departing from the spirit of our invention, the scope of which is to be determined by the appended claims.

We claim:

1. A valve of the class described comprising a hollow valve body having a hollow extension at one end, a piston reciprocably mounted in said valve body and retractable into said extension, and means for holding said piston selectively in retracted and non-retracted positions comprising an L-stem on said piston projecting beyond said extension and adapted to engage the extension when the piston is in non-retracted position, two longitudinally spaced index holes in said extension, a J-shaped pin the legs of which are spaced apart substantially the same distance as said holes and engageable therein, and a concavity in said piston engageable by a leg of said pin when said concavity is aligned with one of said holes.

2. A valve of the class described comprising a tubular valve body with a coaxial tubular extension at one end, a piston reciprocably mounted therein being retractable from a closed position in said valve body to an open position in said extension, and means for positioning said piston selectively in either of said positions comprising a stem projecting from said piston beyond said extension and having a lateral projection engageable with said extension when the piston is in closed position, a first indexing hole in said extension at the stem side of said piston when the latter is in closed position, a second indexing hole in said extension spaced longitudinally from the first indexing hole, a J-pin the legs of which are spaced apart the same distance as said indexing holes and insertable therein, and a leg-receiving concavity in said piston spaced from the stem end thereof substantially the same distance as said indexing holes.

3. In a valve of the class described, the combination of a hollow valve body having a piston-receiving socket at one end thereof, a piston reciprocably mounted in said valve body and retractable from a closed position therein to a retracted position in said socket, said piston having a stem at the socket end thereof projecting beyond said socket, and piston-positioning means comprising a J-pin, two indexing holes in said socket, a lateral offset on said stem, and a concavity in said piston, said J-pin having legs spaced a predetermined distance apart, the indexing holes being spaced apart longitudinally the same distance and of sufficient size to receive said legs, said concavity being spaced that same distance from the stem end of the piston, and said lateral offset being spaced from said piston sufficiently to bear endwise against said socket when the piston is in closed position.

References Cited in the file of this patent

UNITED STATES PATENTS

| 1,027,061 | Norling | May 21, 1912 |
| 1,092,691 | Bryson | Apr. 7, 1914 |
| 2,723,829 | Anderson | Nov. 15, 1955 |
| 2,798,690 | Nelson | July 9, 1957 |

FOREIGN PATENTS

| 13,049 | Great Britain | Aug. 19, 1889 |